Dec. 26, 1961   N. F. MURRAY   3,014,326
DEFLECTOR FOR HARVESTER PLATFORM
Filed Aug. 18, 1959   2 Sheets-Sheet 1
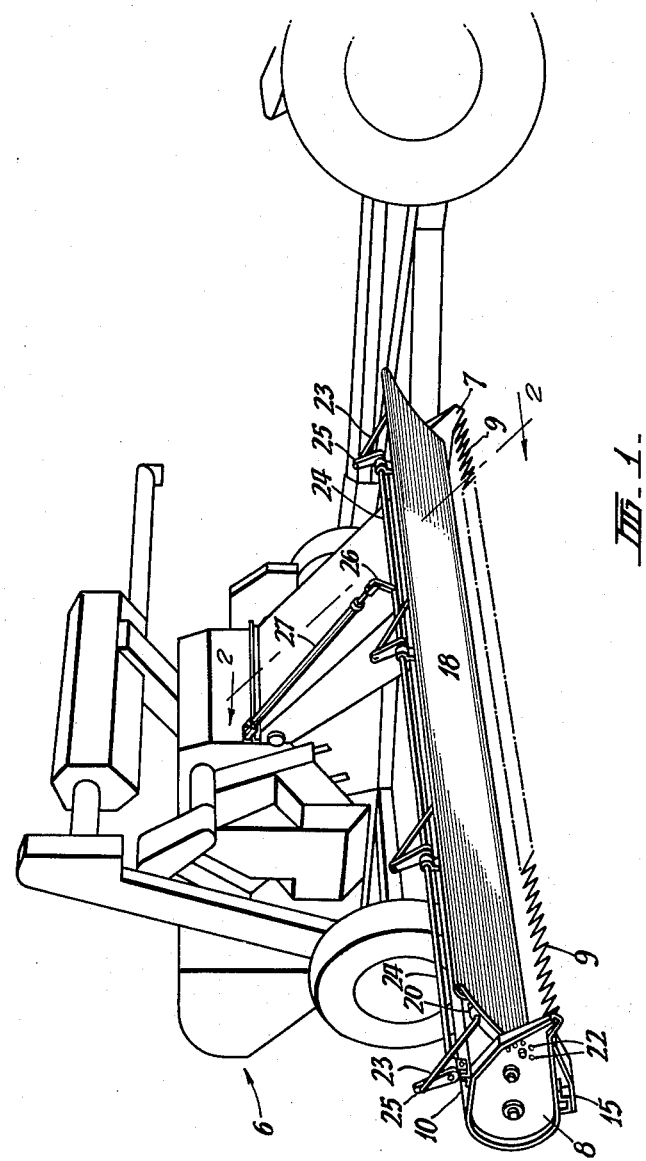
Inventor:
Neil Fulton Murray
Paul O. Lippies
Atty.

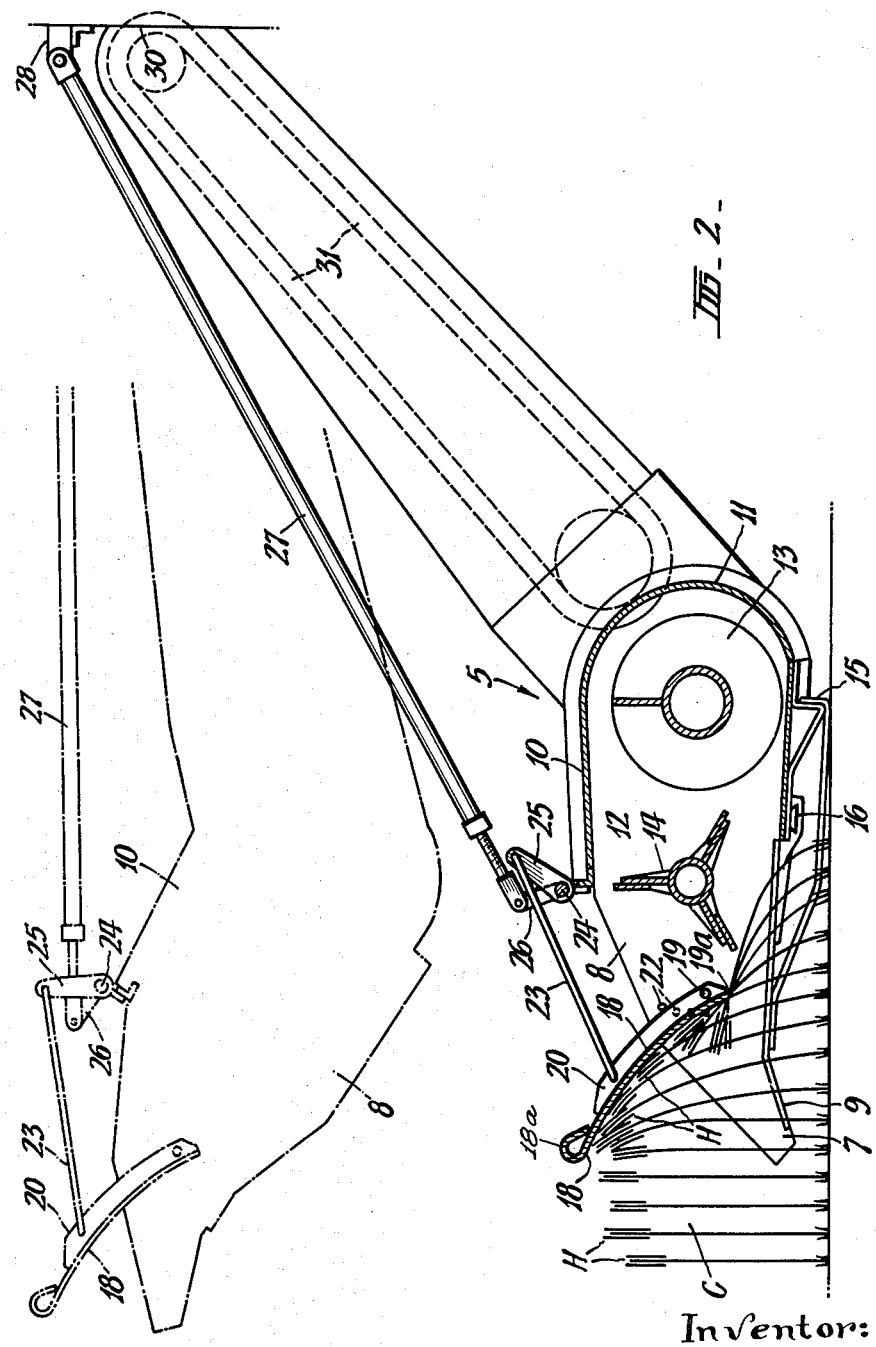

3,014,326
DEFLECTOR FOR HARVESTER PLATFORM

Neil Fulton Murray, Geelong, Victoria, Australia, assignor to International Harvester Company, Chicago, Ill., a corporation of New Jersey
Filed Aug. 18, 1959, Ser. No. 834,493
Claims priority, application Australia Aug. 25, 1958
4 Claims. (Cl. 56—1)

This invention relates to harvester threshers of the type having a transversely disposed harvester part for the severing of a standing crop and a cooperative longitudinally disposed thresher part to thresh and separate grain from the crop harvested by the harvester part.

The invention is particularly concerned with the transverse harvester part which includes a comb or sickle guard to travel through a standing crop in advance of a reciprocating sickle or knife bar and carry the harvested or severed heads of grain and material to a transverse trough or deck in which a conveyor picks up and carries the harvested crop material to a feeder conveyor or elevator for carrying the harvested crop to the longitudinal thresher part. A transversely disposed beater is positioned parallel to and forwardly of the conveyor to sweep harvested grain material into the platform conveyor.

In the past, harvester threshers have, on some occasions, had an upper transverse forward portion and edge of the platform or trough, defining the mouth of the latter, which is rolled and has a tendency to strike grain stalks and heads projecting through the comb in transit to the platform mouth whereby grain may be split and deflected on impact from the mouth and lost, particularly in full and ripe heads of grain.

This loss of grain is appreciable under certain working conditions and accordingly it is a principal object of the present invention to provide in a transverse harvester part of a harvester thresher a simple and effective means for preventing the loss of grain by ensuring that practically all of the stalks or heads projecting upwardly through the sickle comb, as well as any split or parted grain, are positively directed and guided towards the mouth of the trough of said harvester part.

A further object of this invention is to provide a grain deflecting and guiding means capable of adjustment relatively to the mouth or feeding side of the platform or trough to accommodate any height or condition of the standing crop being harvested.

Another and further important object of this invention is to supply a transversely disposed deflector mounted to extend across the full width of the platform sickle guard or comb at a position spaced thereabove and the deflector projecting upwardly and forwardly above the front of the platform, the form or contour of the deflector being such that the stalks and heads of grain projecting upwardly through the sickle comb contact with and are forwardly bent or folded over for delivery into the mouth of the trough.

Still another important object of this invention is the provision of a grain deflector which is concavely contoured such that there is no appreciable impact upon the projecting stalks and heads of grain likely to break or split the heads, when they come in contact with the surface of the grain deflector.

Another important object of this invention is to equip a harvester platform with means to bend or deflect standing stalks forwardly and downwardly for delivery toward a transversely disposed sickle or knife bar and onto the platform in that form or condition as the implement advances.

Another important object of this invention is to provide a removably attached grain deflector for harvester platforms which may have relative movement at will to adjust its angle of inclination over the platform sickle at the forward end thereof and to remain at a relatively fixed deflecting angle regardless of the height of cut being made by the harvester platform.

Other and further important objects and advantages will become apparent from the following specification and the accompanying drawings.

In the drawings:

FIG. 1 is a perspective view of a harvester thresher showing the grain deflector of this invention in an operating position thereon.

FIG. 2 is an enlarged vertical sectional view taken on the line 2—2 of FIG. 1 in which the full lines depict the grain deflector in an operative position and the dot-dash lines show the harvester platform and deflector in transport position.

As shown in the drawings: The reference numeral 5 indicates generally a transversely disposed harvester of the harvester thresher or combine indicated generally at 6. A pair of horizontally aligned complementary spaced apart end plates 7 and 8 are bridged at the front by a sickle or comb 9 which merges into a rear body 10, having a semi-cylindrical back 11. This composite structure is generally termed a platform or trough 12.

The platform or trough 12 carries a feed screw or auger 13 for aggregating harvested grain on the platform. A beater or paddle type conveyor 14 is located at a position adjacent the front of the trough 12 and is disposed generally parallel to the transversely disposed platform auger 13. The paddle conveyor 14 is for the purpose of continuing the movement of grain rearwardly across the cutter and into the platform auger 13.

The sickle or comb 9 with its reciprocating knife is supported by ground engaging skids 15. As shown in FIG. 2 a conventional reciprocating knife bar 16 coacts with the sickle 9 to effect a severing of standing grain being harvested.

A grain deflector consists of a concavely shaped plate 18 suspended between the platform ends 7 and 8. The deflector is generally disposed upwardly and forwardly from a point just about midway in the depth of the platform 12 to a point above the latter, whereby the upper end or top 18a of the deflector is located substantially vertically above the tip of the sickle 9.

The deflector plate 18 is reinforced by a number of laterally spaced apart generally vertically disposed ribs 20, one of which is disposed at each end of the deflector plate 18. The means for suspending the deflector plate on the platform is by pivotal connections comprising pivot pins 19 passing through the deflector ribs and the platform end walls. The pivot or hinge pins 19 are positioned adjacent to the bottom 19a of the deflector plate which is disposed over the sickle or comb 9.

To slightly vary the inclination and the level or height of the deflector plate 18 above and relatively to the platform deck, the pivot pins 19 forming a transverse axis, may be selectively located in any one of a series of aligning holes 22 in the platform end plates 7 and 8.

Each end rib 20 upon the deflector plate 18 has pivotally connected thereto one end of a rearwardly and upwardly inclined link part 23, the other end of which is pivotally connected to the upper end of an upwardly and rearwardly inclined arm 25 constituting a first arm of a crank member which is pivotally carried upon a transverse spindle 24 journalled in terminal brackets mounted upon the platform body 10.

The above mentioned spindle or hinge pin 24 carries a second arm 26 of the crank member to which is pivotally connected one end of an upwardly and rearwardly inclined connecting rod or link 27. The upper rearward end of the link part 27 is pivotally connected on a transverse axis in a bracket 28 carried upon the frame, support or casing 30 of the thresher. To complete the description of the entire machine it should be explained that harvested material is carried from the platform by an undershot elevator 31 to the threshing and separating mechanisms 6. The connecting rod 27 is thus coupled to a relatively fixed part of the longitudinally disposed thresher part of the implement.

Referring now to FIG. 2 in which the platform is shown in its lowered operative position, to travel through a standing crop C, it should be observed that the deflector plate 18 is disposed to project above the standing crop so as to contact with and engage the upper portions of the stalks and including heads H of the grain.

The stalks and heads H are thus bent over or folded forwardly and downwardly as the deflector plate moves forwardly through a standing crop. This forward bending of the stalks tends to eliminate fracture or parting of the heads. The stalks are held in their bent condition immediately above the sickle 9 and within the lower section of the platform or trough 12 as viewed in FIG. 2. Thus while the grain is bent by the deflector it is carried in that condition for severing by the reciprocating knife bar 16. The severed heads H of the grain then pass into and are picked up by the auger 13 in a conventional manner.

As will now be understood, the deflector plate 18 contacts, folds, or bends the stalks and heads H of grain in the manner described to thereby eliminate spilling or parting of the grain heads. The cutting in this condition insures that any grain that is split or parted will fall onto the platform to be swept by the beater 14 into the auger 13.

The action of the deflector plate 18 is clearly shown in FIG. 2. The height and curvature of the deflector is such that most of the heads H are retained whole for the operation of the knife bar 16, and thus the current wastage of grain is practically eliminated.

The link means connecting the deflector plate 18 to the stationary support as hereinbefore described operates to maintain the same at a substantially constant angle of inclination relative to the crop and ground irrespective of any adjustment of the level of the harvester platform to accommodate any height of standing crop.

The level of the platform is set by effecting the angular movement of the transverse harvester part about its axis in a conventional manner. If the platform is raised there is put into effect a generally parallel linkage. This generally parallel linkage includes the platform and its integral feeder housing as the lower link, the link parts 23 and 27 as the upper link means, the stationary member joining the pivots 30 and 28 as the upper vertical link, and the deflector plate 18 as the lower vertical link. Minor length adjustments may be made in the link part 27 at 27a.

As the platform is raised and carries with it the grain deflector 18 the relative disposition of the pivots of the linkage described is such that the crank member arms 25 and 26 impart a self adjusting forward thrust to the deflector 18. The movement of the link parts 23 effects a slight angular movement of the grain deflector 18 relative to the platform about the pivot axis 19 of the deflector to an extent sufficient to maintain the grain deflector in substantially the same inclination to the ground and at an operative disposition over the grain cutting sickle irrespective of the elevation of the platform as will be apparent from FIG. 2.

Thus should the operator raise the platform to cut at a higher position on a standing crop the grain deflector 18 through the self adjusting movement of the above linkage will assume approximately the same relative angular position to the sickle and the ground and function as hereinbefore described.

I claim:

1. A deflector for standing grain for mounting on and cooperating with a harvester platform of the type which is hingedly mounted on a transverse axis on a support and in which there is a grain cutting sickle on the forward lower edge thereof, comprising a generally transversely disposed deflector plate, said deflector plate hingedly mounted at its lower end on said platform on a transverse axis parallel to and spaced downwardly and forwardly from the hinged mounting of the harvester platform on the support, said deflector plate disposed substantially over said sickle, a link means pivotally mounted at its upper rearward end on said support at a position vertically spaced above said hinged mounting of said harvester platform, and said link means pivotally mounted at its lower forward end to an upper portion of said deflector plate whereby the arrangement acts as a general parallel linkage to maintain a generally constant angle of disposition of said deflector plate regardless of the angle of inclination of the harvester platform about its hinge mounting.

2. A device as set forth in claim 1 in which said link means is adjustable in length to provide for changing the angular disposition of the deflector plate.

3. A device as set forth in claim 1 in which said link means includes a first link part and a generally axially aligned second link part, a crank member pivotally mounted on said platform, said crank member having angularly spaced arms, said first link part having its upper rearward end constituting the pivotal mounting of the link means on said support, and said first link part having its lower forward end pivotally mounted on one of said angularly spaced arms of the crank member, said second link part having its lower forward end constituting the pivotal mounting of the link means to said deflector plate, and said second link part having its upper rearward end pivotally mounted on the other of said angularly spaced arms of the crank member.

4. A device as set forth in claim 1 in which the deflector plate is concavely contoured.

References Cited in the file of this patent

UNITED STATES PATENTS

| | | |
|---|---|---|
| 2,216,313 | Fulton | Oct. 1, 1940 |
| 2,333,153 | Crow | Nov. 2, 1943 |
| 2,454,063 | Irvine | Nov. 16, 1948 |
| 2,747,357 | Bert et al. | May 29, 1956 |
| 2,763,118 | Gustafson | Sept. 18, 1956 |